United States Patent
Akanda et al.

(10) Patent No.: US 9,910,740 B1
(45) Date of Patent: Mar. 6, 2018

(54) CONCURRENT RECOVERY OPERATION MANAGEMENT

(71) Applicant: EMC Corporation, Hopkinton, MA (US)

(72) Inventors: Mohammed A. Akanda, Redmond, WA (US); Scott C. Teerink, Mukilteo, WA (US); Michael D. Hartway, Sammamish, WA (US); Jerzy Gruszka, Bellevue, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 288 days.

(21) Appl. No.: 14/320,216

(22) Filed: Jun. 30, 2014

(51) Int. Cl.
*G06F 17/30* (2006.01)
*G06F 11/14* (2006.01)

(52) U.S. Cl.
CPC .... *G06F 11/1458* (2013.01); *G06F 17/30117* (2013.01); *G06F 17/30581* (2013.01)

(58) Field of Classification Search
CPC ............. G06F 11/2094; G06F 11/1469; G06F 11/1471; G06F 11/2097; G06F 2201/82; G06F 2201/84; G06F 11/0727; G06F 11/0793; G06F 11/1484; G06F 11/202; G06F 11/2033; G06F 2201/815; G06F 3/0685; G06F 17/30581; G06F 17/30117; G06F 17/30362; G06F 17/30864; G06F 17/30309; G06F 3/0619; G06F 3/065; G06F 3/067; G06F 3/0665; G06F 11/073; G06F 11/1458; G06F 17/30; H04L 41/0213; H04L 41/069

See application file for complete search history.

(56) References Cited

U.S. PATENT DOCUMENTS

| | | | | | |
|---|---|---|---|---|---|
| 5,805,790 | A | * | 9/1998 | Nota | G06F 11/203 714/10 |
| 5,978,785 | A | * | 11/1999 | Johnson | G06N 5/04 706/54 |
| 6,246,771 | B1 | * | 6/2001 | Stanton | H04L 9/0894 380/286 |
| 6,701,455 | B1 | * | 3/2004 | Yamamoto | G06F 11/2064 707/999.202 |
| 7,082,506 | B2 | * | 7/2006 | Nakano | G06F 11/2058 711/162 |
| 7,447,710 | B2 | * | 11/2008 | Sampath, Sr. | G06F 11/1471 714/E11.207 |
| 7,480,816 | B1 | * | 1/2009 | Mortazavi | G06F 11/1482 714/10 |

(Continued)

OTHER PUBLICATIONS

Michael Isard—Microsoft Research, Silicon Valley—"Autopilot: automatic data center management"—Published in: Newsletter ACM SIGOPS Operating Systems Review—Systems work at Microsoft Research archive—vol. 41 Issue 2, Apr. 2007 pp. 60-67.*

(Continued)

*Primary Examiner* — Anh Ly
(74) *Attorney, Agent, or Firm* — Peter Jovanovic; Theodore A. Chen; Krishnendu Gupta

(57) ABSTRACT

The present disclosure relates to managing concurrent recovery operations. Operation state may be stored in a repository managed by a service. The service may query the repository as requests come in, and take appropriate actions based on an identified state.

17 Claims, 4 Drawing Sheets

(56) References Cited

U.S. PATENT DOCUMENTS

| | | | | |
|---|---|---|---|---|
| 7,685,460 B1* | 3/2010 | Bingham | ............ | G06F 11/1469 714/6.11 |
| 7,788,521 B1* | 8/2010 | Sim-Tang | ............ | G06F 11/1471 714/20 |
| 9,424,152 B1* | 8/2016 | Raut | ................ | G06F 11/2069 714/19 |
| 2004/0068479 A1* | 4/2004 | Wolfson | ............ | G06F 17/30578 707/E17.005 |
| 2004/0080558 A1* | 4/2004 | Blumenau | ........... | G06F 11/1435 347/19 |
| 2005/0187891 A1* | 8/2005 | Johnson | ................ | G06F 11/202 714/E11.092 |
| 2005/0215725 A1* | 9/2005 | St. Clair | ............. | C08F 297/044 525/314 |
| 2008/0109448 A1* | 5/2008 | Aboel-Nil | ............ | G06Q 10/107 707/E17.001 |
| 2008/0201467 A1* | 8/2008 | Delany | ................... | G06F 9/542 709/224 |
| 2009/0210427 A1* | 8/2009 | Eidler | ................. | G06F 11/1484 707/E17.008 |
| 2009/0313503 A1* | 12/2009 | Atluri | ................. | G06F 11/1453 714/19 |
| 2011/0099420 A1* | 4/2011 | MacDonald | ........ | G06F 11/2025 714/6.32 |
| 2012/0059693 A1* | 3/2012 | Colodny | ............... | G06Q 10/083 705/14.1 |
| 2014/0082412 A1* | 3/2014 | Matsumura | ......... | G06F 11/1402 714/6.12 |
| 2015/0089280 A1* | 3/2015 | Sade | ..................... | G06F 11/073 714/6.12 |
| 2015/0242481 A1* | 8/2015 | Hasegawa | ............... | G06F 17/30 707/623 |
| 2016/0147615 A1* | 5/2016 | Schefe | ................ | G06F 11/1469 714/19 |

OTHER PUBLICATIONS

V. F. Nicola and Johannes M. Van Spanje—"Comparative Analysis of Different Models of Checkpointing and Recovery"—Published in: IEEE Transactions on Software Engineering ( vol. 16, Issue: 8, Aug. 1990 )—pp. 807-821.*

* cited by examiner

CONCURRENT RECOVERY OPERATION MANAGEMENT

FIELD OF THE INVENTION

This invention relates generally to backup and recovery systems, and more particularly to systems and methods for managing recovery operations.

BACKGROUND OF THE INVENTION

Individuals and organizations rely on information stored on their computer systems. This information may be stored locally or remotely, and loss of the data may lead to stress and significant expense. To protect against data loss, individuals and organizations often create data backups. These data backups may be used to restore data to a system in the event of data loss.

Restoring data to a system may require a recovery operation. There is a need, therefore, for an improved system and process for managing concurrent recovery operations.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
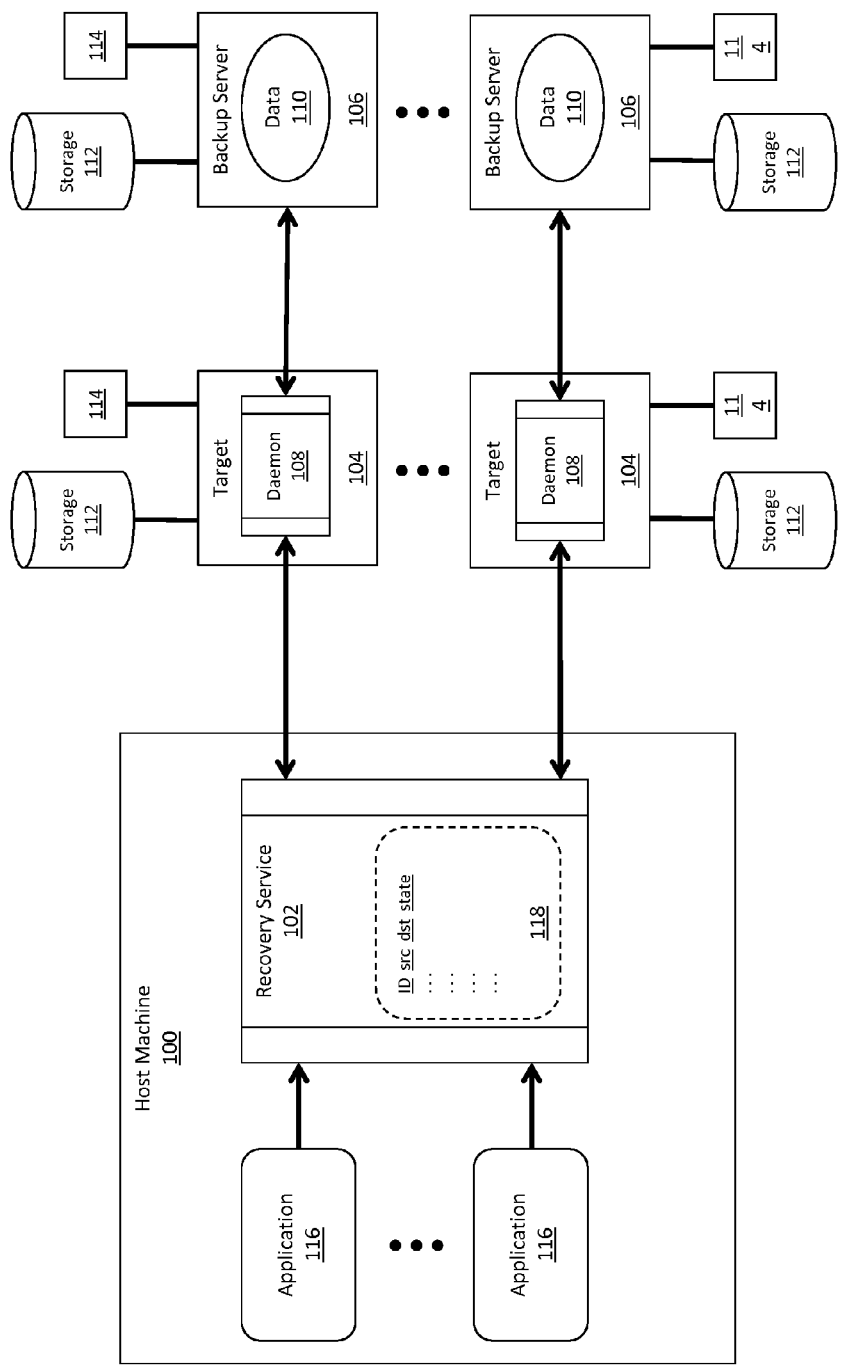
FIG. 1 depicts a system for managing concurrent recovery operations consistent with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The present disclosure discusses systems, methods, and processes for managing recovery operations. Recovery applications may be used to trigger recovery operations for recovering backups to one or more target machines. Recovery applications, however, are often global in nature, and may not know of or be in communication with each other. This global nature may introduce system complications. For example, a user may terminate a recovery application during a recovery operation. Early termination may cause incomplete data to be recovered to the target. Subsequent recovery operations may recopy data already restored by the terminated process, thereby redoing completed work. Similarly, two separate recovery applications may attempt to restore the same data to the same location. This may result in redundant restore operations, incomplete restores, or even system failure. The systems, methods, and processes discussed herein alleviate these concerns by providing a central recovery service for managing recovery operations.

FIG. 1 depicts a system architecture for managing concurrent recovery operations. Host machine 100 may comprise recovery service 102 that manages recovery operations restoring backups to target machines 104. Recovery service 102 may communicate with recovery daemon 108, which may be an EMC® Networker® daemon. Daemon 108, which may be running on the recovery target, may then communicate with backup server 106 to retrieve data backup 110 and restore it on target 104. Host machine 100, target 104, and backup server 106 may each comprise computer readable storage medium 112 and processer 114, and in some embodiments may be general purpose computers as discussed in reference to FIG. 4.

In some embodiments, the system shown in FIG. 1 may have a distributed architecture. For example, there may be one or more targets, backup servers, and host machines. Additionally or alternatively, different architectural components may operate on any of the machines in the distributed system. For example, recovery service 102 may actually run on a target machine 104 or backup server 106 rather than a separate host machine. Similarly, host machine 100 may itself be a backup server or target machine.

Recovery service 102 may manage multiple and/or concurrent recovery operations. Applications 116, targets 104, backup servers 106, and/or an application or machine external to the depicted architecture may communicate with recovery service 102 to trigger recovery operations. This communication may identify a target and a backup to be restored to that target. For example, the communication may specific data 110 is to be restored to target 104.

In some embodiments, recovery service 102 may be a Windows service implemented using the Windows Communication Foundation ("WCF") framework. The service may operate as a standalone service, and may provide a common interface for applications to perform recoveries. As discussed below, multiple applications may call this service concurrently to initiate recovery operations for themselves or other machines in the environment.

Recovery service 102 may maintain recovery operation state information in repository 118. For example, repository 118 may maintain a recovery identifier, source, destination, and state of recovery operations initiated by applications 116. The recovery identifier may uniquely identify recovery operations managed by recovery service 102. The source may be the source of the backed-up data, the location of the data backup (e.g. backup server 106), or both. Destination may be the machine or location the data is being restored to. Finally, states may be the state of the given recovery operation.

States may include in-progress, finished, successful, void, or stalled. In-progress may indicate that the recovery operation is currently restoring data to a given target. Finished may indicate that the recovery operation has finished restoring data to a target, whether it failed or was successful, and in some embodiments may include a timestamp identifying when the operation completed. Stalled states may indicate that the recovery operation has stalled due to user intervention, system failure, or other causes.

In an embodiment, states may also be associated with a status. For example, error, warning, and info metadata may provide varying levels of information similar to a log file, and may reference a description providing further information about the error, warning, or info.

In some embodiments, the recovery service and state repository may provide auditing services. For example, the recovery service may query the repository to create an audit trail. This audit trail could provide, for example, the number of virtual machines recovered within a specified time frame, or may identify the user/application that initiated the recovery operations. The audit may also be used to derive information about specific machines and debug errors. For example, if recovery operations frequently stall or fail for a particular target, there may be an issue with the network communication between the target and the backup server.

Repository 118 may be either persistent or non-persistent. For example, repository 118 may be maintained in a computer memory. Additionally or alternatively, repository 118 may reside on a storage device, such as SSD or disk. In some embodiments, repository 118 may store the operation's states as data objects, database tables, and/or text files.

The system depicted in FIG. 1 may be used to restore any type of data to a target machine. For example, data 110 may comprise a volume snapshot recovered using Volume Shadow Copy Service ("VSS"). VSS may be a windows service for taking block level backup snapshots of a storage volume, and subsequently recovering those backup snapshots to a target machine. In some embodiments, VSS may only be run once for a particular machine. In such an embodiment, the recovery service and repository may be particularly beneficial. If a request to recover a volume snapshot is received, the repository may be queried to identify whether a VSS recovery operation is already running. If it is, the request may be ignored or the requestor may be notified. This may prevent multiple applications for initiating VSS recovery operations on the same target.

Figure 2:
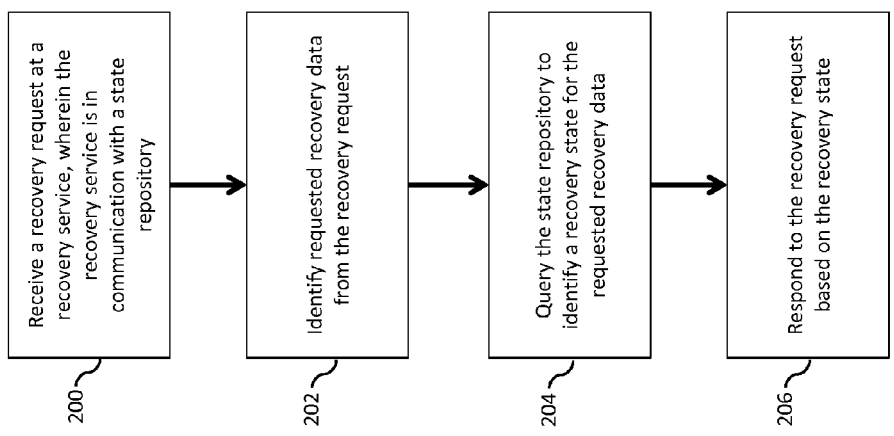
FIG. 2 depicts a process for managing concurrent recovery operations consistent with an embodiment of the present disclosure

Turning now to FIG. 2, a method for managing concurrent recovery operations in a system similar to that depicted in FIG. 1 is discussed. At block 200, a recovery request may be received at a recovery service. The recovery request may be received from an application, such as application 116. In some embodiments, recovery service may be substantially similar to recovery service 102, and may be in communication with a state repository, such as state repository 118.

In some embodiments, the recovery request may be placed on a queue. The queue may be part of the recovery service, or may be an external process. Recovery requests may be retrieved from the queue and processed by the recovery service in the order which they are received. Alternatively, recovery requests may be given different priorities based on application or user preference. Requests with a higher priority may be retrieved from the queue before other requests, regardless of when they were received.

At 202, recovery data may be identified from the recovery request. This recovery data may be, for example, data 110 residing on backup server 106, and in some embodiments is a data backup. The recovery request may contain a pointer, identifier, or other reference to the data, and identifying the data may comprise removing this data reference from the recovery request.

At block 204, a state repository may be queried to identify a recovery state for the requested recovery data. The state repository could be, for example, state repository 118. In some embodiments, a data reference received in the recovery request may be used to identify entries comprising the state data. For example, the data reference may be compared to the recovery identifiers in the state repository. Additionally or alternatively, a source, destination, and/or data backup specified in the recovery request may be used to identify state data. Once a relevant entry is located, the recovery service may determine a recovery state associated with that entry. If no entry is found, a new entry may be created and the recovery operation may begin.

At block 206, the system may respond to the request based on the identified recovery state. For example, the identified recovery state may be one or more of an in-progress state, a finished state, successful state, stalled state, or void state. States may further be associated with a status, such as an error status, an info status, a warning or status.

An in-progress state may indicate that there is already a recovery operation in progress for the recovery request. For example, a previous request may have initiated a process to recover the same data to the same host device. In response, the recovery may notify the requester that the recovery operation is in progress, or may simply ignore the request.

A finished state may indicate that a recovery operation identical to the one identified in the request has already finished. In response, the requestor may be notified that the operation has finished, the request may be ignored, or the recovery operation may be re-initiated and run a second time.

A successful state may indicate the recovery operation completed successfully. In some embodiments, it may be similar to a finished state. Alternatively, a finished state may always be associated with a status (e.g. warning or info), whereas a successful state may indicate the recovery operation was successful and not convey any additional information.

A void state may indicate that either an entry does not exist, or its status is unknown. In the former case, a new recovery operation may be initiated. In the latter case, the requestor may be notified and prompted to take remedial actions.

A stalled state may indicate that the recovery operation was initiated, but stalled somewhere along the way. This could be the result of a system or network error. In response, the operation may be resumed or restarted.

In some embodiments, multiple states may be associated with the recovery operation. For example, the operation may have both an error state and a stalled state. Multiple responses and actions may be taken for each of these states.

An error status, info status, or warning status may be associated with the states and may contain varying degrees of information. For example, the error status may indicate that the recovery operation encountered an error. The state may be associated with a description of the error, which may include information about why the error occurred and any remedial actions taken/needed. The requestor may be provided with this information and prompted to take remedial steps, such are re-initiating the recovery operation. Warning and info statuses may similarly be associated with a description containing additional information.

Figure 3:
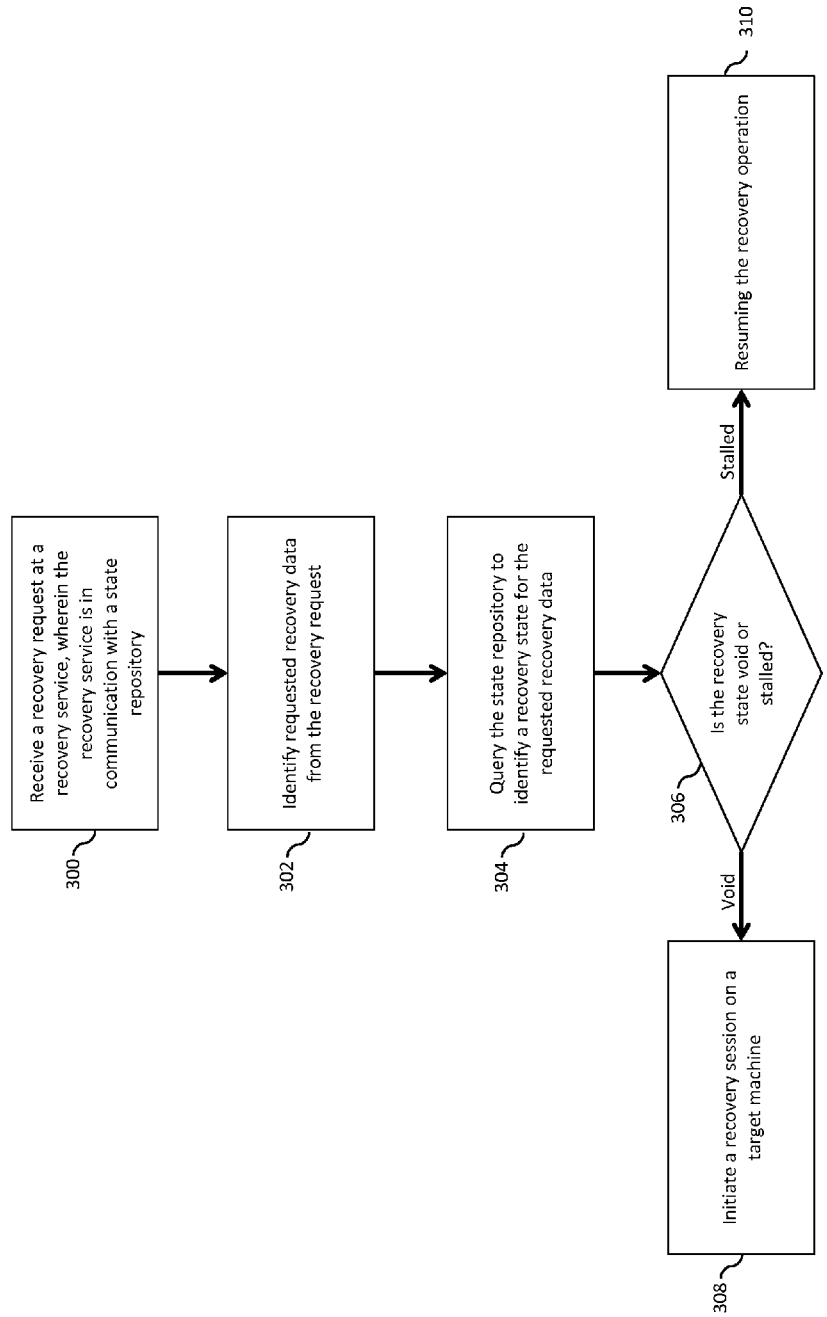
FIG. 3 depicts a process for handling stalled or void process states consistent with an embodiment of the present disclosure.

FIG. 3 depicts different actions to take in response to a stalled or void state. In an embodiment, blocks 300-304 may be substantially similar to 200-204 discussed above.

At 306, the recovery service may determine whether the state is stalled or void. If the state is void, a recovery operation may be initiated on a target machine at block 308. Initiating a recovery operation on a target machine may comprise sending an instruction to a daemon or other software application operating on that machine. The daemon may then communicate with the appropriate backup server to retrieve the data.

If the state is stalled, the recovery operation may be resumed at block 310. In an embodiment, resuming a recovery operation comprises sending a resume instruction to the daemon operating on the target server. Alternatively, a stalled recovery operation may be terminated and re-initiated.

Figure 4:
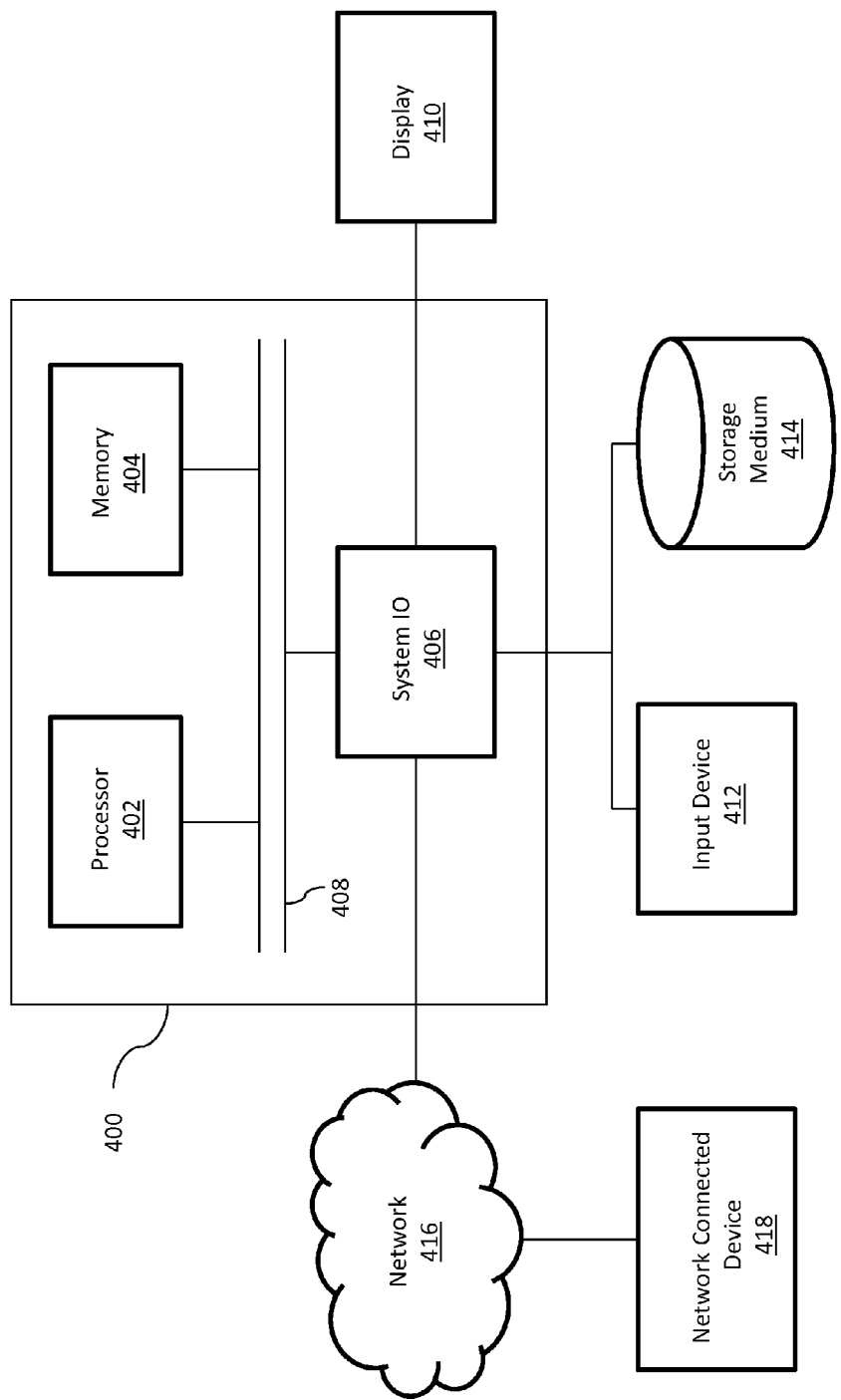
FIG. 4 depicts a general purpose computer system consistent with an embodiment of the present disclosure.

FIG. 4 depicts a computer system which may be used to implement different embodiments discussed herein. General purpose computer 400 may include processor 402, memory 404, and system 10 controller 406, all of which may be in communication over system bus 408. In an embodiment, processor 402 may be a central processing unit ("CPU") or accelerated processing unit ("APU"). Some embodiments may comprise multiple processors, or a processor with multiple cores. Processor 402 and memory 404 may together execute a computer process, such as the processes described herein.

System 10 controller 406 may be in communication with display 410, input device 412, non-transitory computer readable storage medium 414, and/or network 416. Display 410 may be any computer display, such as a monitor, a smart phone screen, or wearable electronics and/or it may be an input device such as a touch screen. Input device 412 may be a keyboard, mouse, track-pad, camera, microphone, or the like, and storage medium 414 may comprise a hard drive, flash drive, solid state drive, magnetic tape, magnetic disk, optical disk, or any other computer readable and/or writable medium. Storage device 414 may also reside inside general purpose computer 400, rather than outside as shown in FIG. 1.

Network 416 may be any computer network, such as a local area network ("LAN"), wide area network ("WAN") such as the internet, a corporate intranet, a metropolitan area network ("MAN"), a storage area network ("SAN"), a cellular network, a personal area network (PAN), or any combination thereof. Further, network 416 may be either wired or wireless or any combination thereof, and may provide input to or receive output from IO controller 406. In an embodiment, network 416 may be in communication with one or more network connected devices 418, such as another general purpose computer, smart phone, PDA, storage device, tablet computer, or any other device capable of connecting to a network.

For the sake of clarity, the processes and methods herein have been illustrated with a specific flow, but it should be understood that other sequences may be possible and that some may be performed in parallel, without departing from the spirit of the invention. Additionally, steps may be sub-divided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A computer-implemented method for managing recovery operations in a data storage system, the method comprising:
   receiving a recovery request at a recovery service of the data storage system, wherein the recovery service is in communication with a state repository of the data storage system, wherein the recovery request comprises a recovery source and a recovery destination;
   identifying requested recovery data from the recovery request;
   querying the state repository to identify a recovery state for the requested recovery data, wherein the recovery state comprises a state source and a state destination, wherein the recovery state is identified using the recovery source and the recovery destination;
   responding to the recovery request based on the recovery state;
   querying the state repository to create an audit trail, the audit trail comprising recovery operations of the data storage system; and
   deriving errors from the audit trail.

2. The method of claim 1, wherein the state repository comprises a non-transitory computer readable storage medium.

3. The method of claim 1, wherein the recovery state comprises one of a progress state, a finished state, an error state, an info state, a warning state, a void state, and a stalled state.

4. The method of claim 1, further comprising initiating a recovery session on a target machine when the recovery state is a void state.

5. The method of claim 1, wherein the requested recovery data comprises one of a volume snapshot request and a virtual machine snapshot request.

6. The method of claim 1, wherein the recovery service is a windows service implemented using a Windows Communication Foundation ("WCF") framework.

7. The method of claim 1, further comprising resuming a recovery operation when the recovery state is a stalled state.

8. A computer program product for managing recover operations in a data storage system, the computer program product comprising a non-transitory computer readable medium encoded with computer executable program, the code enabling:

receiving a recovery request at a recovery service of the data storage system, wherein the recovery service is in communication with a state repository of the data storage system, wherein the recovery request comprises a recovery source and a recovery destination;

identifying requested recovery data from the recovery request;

querying the state repository to identify a recovery state for the requested recovery data, wherein the recovery state comprises a state source and a state destination, wherein the recovery state is identified using the recovery source and the recovery destination;

responding to the recovery request based on the recovery state;

querying the state repository to create an audit trail, the audit trail comprising recovery operations of the data storage system; and deriving errors from the audit trail.

9. The computer program product of claim 8, wherein the recovery state comprises one of a progress state, a finished state, an error state, an info state, a warning state, a void state, and a stalled state.

10. The computer program product of claim 8, further comprising initiating a recovery session on a target machine when the recovery state is a void state.

11. The computer program product of claim 8, wherein the requested recovery data comprises one of a volume snapshot request and a virtual machine snapshot request.

12. The computer program product of claim 8, further comprising resuming a recovery operation when the recovery state is a stalled state.

13. A system for managing recover operations in a data storage system, the system comprising a computer processor configured to execute instructions comprising:

receiving a recovery request at a recovery service of the data storage system, wherein the recovery service is in communication with a state repository of the data storage system, wherein the recovery request comprises a recovery source and a recovery destination;

identifying requested recovery data from the recovery request;

querying the state repository to identify a recovery state for the requested recovery data, wherein the recovery state comprises a state source and a state destination, wherein the recovery state is identified using the recovery source and the recovery destination;

responding to the recovery request based on the recovery state;

querying the state repository to create an audit trail, the audit trail comprising recovery operations of the data storage system; and deriving errors from the audit trail.

14. The system of claim 13, wherein the recovery state comprises one of a progress state, a finished state, an error state, an info state, a warning state, a void state, and a stalled state.

15. The system of claim 13, further comprising initiating a recovery session on a target machine when the recovery state is a void state.

16. The system of claim 13, wherein the requested recovery data comprises one of a volume snapshot request and a virtual machine snapshot request.

17. The system of claim 13, further comprising resuming a recovery operation when the recovery state is a stalled state.

* * * * *